(12) United States Patent
Lee et al.

(10) Patent No.: US 8,704,964 B2
(45) Date of Patent: Apr. 22, 2014

(54) LIQUID CRYSTAL DISPLAY DEVICE

(75) Inventors: Young-Bin Lee, Daegu (KR); Chung-Oan Seo, Busan (KR)

(73) Assignee: LG Display Co., Ltd., Seoul (KR)

(*) Notice: Subject to any disclaimer, the term of this patent is extended or adjusted under 35 U.S.C. 154(b) by 954 days.

(21) Appl. No.: 12/630,570

(22) Filed: Dec. 3, 2009

(65) Prior Publication Data

US 2010/0165235 A1     Jul. 1, 2010

(30) Foreign Application Priority Data

Dec. 30, 2008    (KR) .................. 10-2008-0136519

(51) Int. Cl.
G02F 1/1333   (2006.01)
G02F 1/1335   (2006.01)

(52) U.S. Cl.
USPC ............ 349/40; 349/58; 349/62; 349/65; 349/67; 362/612; 362/632; 362/634

(58) Field of Classification Search
USPC .......... 349/62, 65, 67, 58; 362/634, 612, 632
See application file for complete search history.

(56) References Cited

U.S. PATENT DOCUMENTS

| 7,083,318 B2 | 8/2006 | Ha et al. | |
| 7,364,345 B2* | 4/2008 | Fang | 362/634 |
| 7,441,938 B2* | 10/2008 | Sakai et al. | 362/634 |
| 8,284,349 B2* | 10/2012 | Kim et al. | 349/65 |
| 2006/0187373 A1* | 8/2006 | Hu | 349/58 |
| 2012/0287369 A1* | 11/2012 | Tsuji | 349/58 |

FOREIGN PATENT DOCUMENTS

| CN | 200710170235 | 5/2008 |
| KR | 1020070000314 A | 1/2007 |
| KR | 1020070101946 A | 10/2007 |
| KR | 1020070116507 A | 12/2007 |

OTHER PUBLICATIONS

Office Action issued in corresponding Chinese Patent Application No. 200910212164.X, mailed Aug. 21, 2012.
Office Action issued in corresponding Korean Patent Application No. 10-2008-0136519, mailed Sep. 18, 2012.
Office Action issued in corresponding Chinese Patent Application No. 200910212164.X, mailed May 25, 2011.

* cited by examiner

*Primary Examiner* — Huyen Ngo
(74) *Attorney, Agent, or Firm* — Brinks Gilson & Lione

(57) ABSTRACT

A liquid crystal display device includes: a bottom frame having a bent portion at an edge thereof; a light guide plate over the bottom frame, the light guide plate spaced apart from the bent portion by a gap; a light emitting diode (LED) assembly facing a side of the light guide plate, the LED assembly fixed to the bent portion; a main frame having a rectangular band shape over the bottom frame, the main frame having a rib corresponding to the gap; a liquid crystal panel over the light guide plate; and a top frame surrounding a front boundary portion of the liquid crystal panel, the top frame combined with the bottom frame and the main frame.

8 Claims, 3 Drawing Sheets

LIQUID CRYSTAL DISPLAY DEVICE

This application claims the benefit of Korean Patent Application No. 2008-0136519 filed on Dec. 30, 2008, which is hereby incorporated by reference in its entirety.

TECHNICAL FIELD

The present application relates to a liquid crystal display device, and more particularly, to a liquid crystal display device where a light leakage is prevented by a main frame.

BACKGROUND

Liquid crystal display (LCD) devices are widely used as a monitor for notebook computers and desktop computers and a television because of their high resolution, high contrast ratio, color rendering capability and superior performance for displaying moving images. An LCD device relies on the optical anisotropy and polarizing properties of liquid crystal to produce an image. A typical LCD device includes a liquid crystal display panel including two substrates and a liquid crystal layer between the two substrates. An electric field generated between the two substrates adjusts an alignment direction of liquid crystal molecules in the liquid crystal layer to produce differences in transmittance.

Because the liquid crystal display panel does not include an emissive element, a light source is required to view images on the liquid crystal display panel. Accordingly, a backlight unit having a light source is disposed under the liquid crystal display panel. The backlight unit for an LCD device may be classified as either a side light type or a direct type according to the position of the light source relative to the LCD panel. In a side light type backlight unit, light emitted from at least one side portion of the liquid crystal display panel is redirected by a light guide plate (LGP) to enter the liquid crystal display panel. In a direct type backlight unit, a plurality of light sources is disposed at a rear surface of the liquid crystal display panel so that light from the plurality of light sources directly enters the liquid crystal display panel.

A cold cathode fluorescent lamp (CCFL) and an external electrode fluorescent lamp (EEFL) have been used as a light source of a backlight unit for a liquid crystal display device. More recently, a light emitting diode (LED) has been used as a light source because the LED has a small size, low power consumption and a high reliability.

FIG. 1 is a cross-sectional view showing a liquid crystal display device including a light emitting diode as a light source according to the related art.

In FIG. 1, a liquid crystal display (LCD) device includes a liquid crystal panel 10, a backlight unit 20, a main frame 30, a top frame 40 and a bottom frame 50. The liquid crystal panel 10 includes first and second substrates 12 and 14 facing and spaced apart from each other and a liquid crystal layer (not shown) between the first and second substrates 12 and 14. Polarizing plates 19a and 19b are formed on outer surfaces of the liquid crystal panel 10.

The backlight unit 20 is disposed under the liquid crystal panel 10. The backlight unit 20 includes a light emitting diode (LED) assembly 29, a reflecting plate 25, a light guide plate 23 and a plurality of optical sheets 21. The LED assembly 29 is disposed along at least one side of the main frame 30, and the reflecting plate 25 having a white color or a silver color is disposed over the bottom frame 50. The light guide plate 23 and the plurality of optical sheets 21 are sequentially disposed over the reflecting plate 25. The LED assembly 29 includes a plurality of LEDs 29a and an LED printed circuit board (PCB) 29b. The plurality of LEDs 29a on the LED PCB 29b are disposed at one side of the light guide plate 23 and emit a white colored light.

The liquid crystal panel 10 and the backlight unit 20 are surrounded by the main frame 30 having a rectangular ring shape, and the top frame 40 surrounding a front boundary portion of the liquid crystal panel 10 and the bottom frame 50 covering a rear surface of the backlight unit 20 are combined with the main frame 30 so that the liquid crystal panel 10 and the backlight unit 20 can be coupled.

FIG. 2 is a magnified cross-sectional view of portion A of FIG. 1.

In FIG. 2, the plurality of LEDs 29a are disposed at one side of the light guide plate 23 and are formed on the LED PCB 29b to constitute an LED assembly 29. The LED assembly 29 is fixed by an attachment so that the light from the plurality of LEDs 29a can face a light-entering portion of the light guide plate 23. Accordingly, an edge of the bottom frame 50 is bent upwardly and then inwardly to have a bent portion 51, and the LED assembly 29 is fixed to the bent portion 51 with an adhesive material such as a dual coated tape. The LED assembly 29 may be referred to as a side top-view type.

As a result, the light F emitted from each of the plurality of LEDs 29a is inputted into the light guide plate 23 through the light-entering portion and is refracted in the light guide plate 23 toward the liquid crystal panel 10. The light refracted in the light guide plate 23 and the light reflected by the reflecting plate 25 are processed as a uniform plane light source of high quality while passing through the plurality of optical sheets 21 and are supplied to the liquid crystal panel 10.

In addition, the bent portion 51 of the bottom frame 50 and the light guide plate 23 are spaced apart from each other by a gap G, and a portion of the light F emitted from the plurality of LEDs 29a leaks through the gap G to cause a light leakage. The light leakage deteriorates the properties such as brightness and color uniformity of the LCD device. The bent portion 51 may be fabricated to minimize the gap G between the bent portion 51 of the bottom frame 50 and the light guide plate 23. However, as minimize the gap G between bent portion 51 and the light guide plate 23, the step of fixing the LED assembly 29 to the bent portion 51 becomes complicated.

SUMMARY

A liquid crystal display device includes: a bottom frame having a bent portion at an edge thereof; a light guide plate over the bottom frame, the light guide plate spaced apart from the bent portion by a gap; a light emitting diode (LED) assembly facing a side of the light guide plate, the LED assembly fixed to the bent portion; a main frame having a rectangular band shape over the bottom frame, the main frame having a rib corresponding to the gap; a liquid crystal panel over the light guide plate; and a top frame surrounding a front boundary portion of the liquid crystal panel, the top frame combined with the bottom frame and the main frame.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts.

Figure 1:
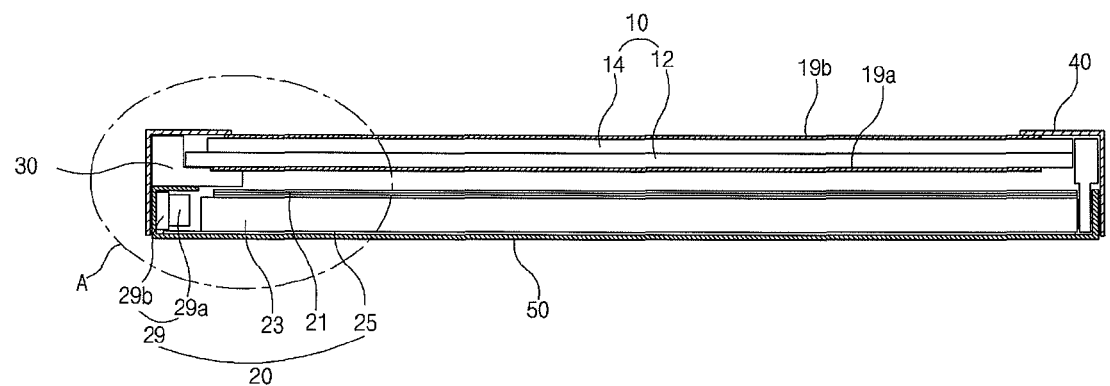
FIG. 1 is a cross-sectional view showing a liquid crystal display device including a light emitting diode as a light source according to the related art.
Figure 2:
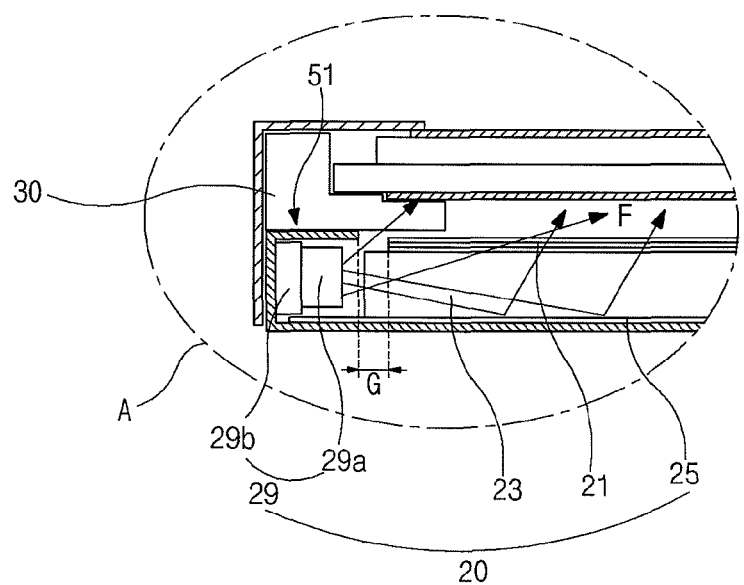
FIG. 2 is a magnified cross-sectional view of portion A of FIG. 1.
Figure 3:
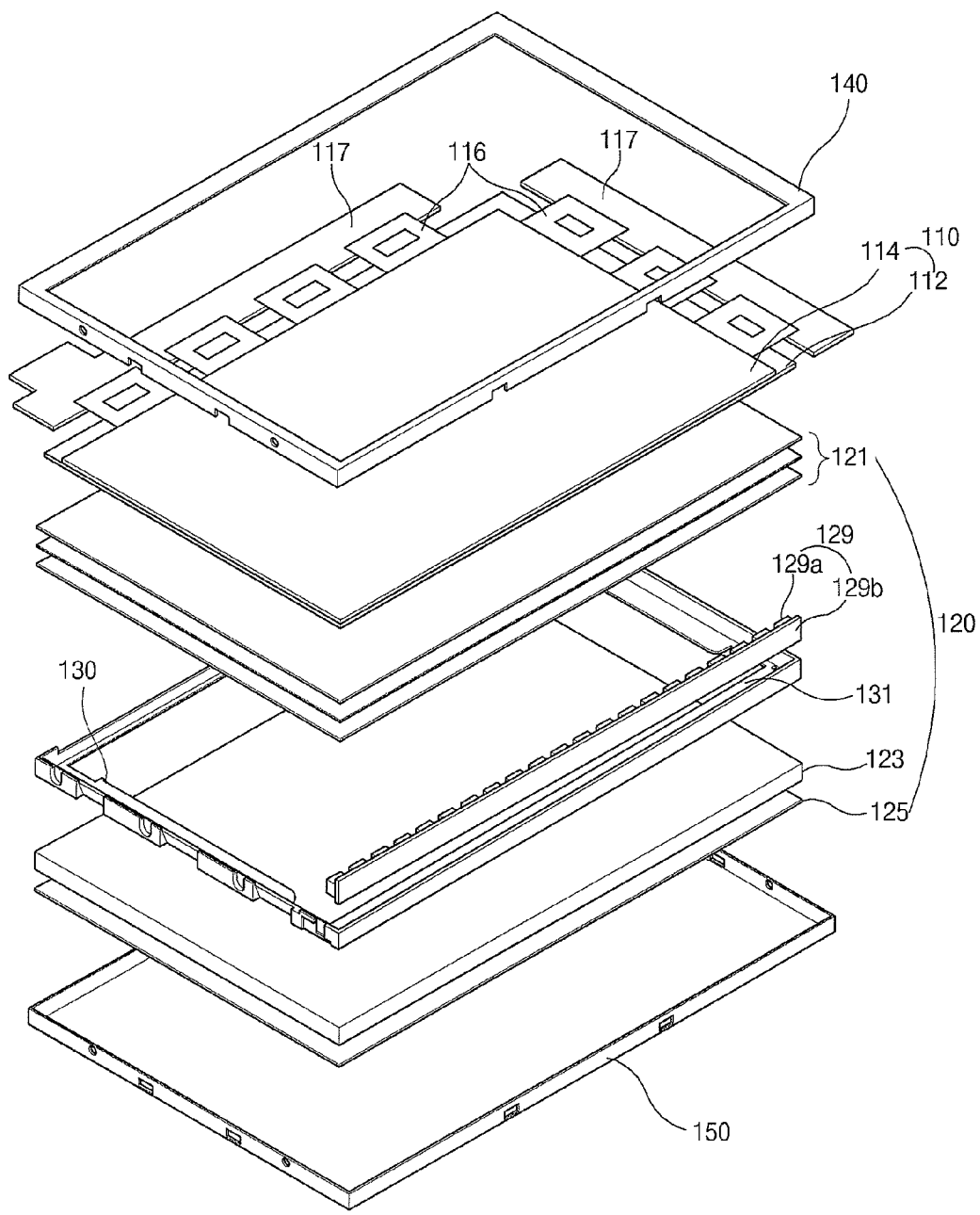
FIG. 3 is an exploded perspective view showing a liquid crystal display device according to an embodiment of the present invention.

FIG. 3 is an exploded perspective view showing a liquid crystal display device according to an embodiment of the present invention.

In FIG. 3 a liquid crystal display (LCD) device includes a liquid crystal panel 110, a backlight unit 120, a main frame 130, a top frame 140 and a bottom frame 150. The liquid crystal panel 110 displaying images includes first and second substrates 112 and 114 facing and spaced apart from each other and a liquid crystal layer (not shown) between the first and second substrates 112 and 114. The first substrate 112 may be referred to as a lower substrate or an array substrate, and the second substrate 114 may be referred to as an upper substrate or a color filter substrate. Although not shown in FIG. 3, a gate line, a data line, a thin film transistor (TFT) including a gate electrode, a semiconductor layer, a source electrode and a drain electrode and a pixel electrode are formed on an inner surface of the first substrate 112. The gate line crosses the data line to define a pixel region and the TFT is connected to the gate line and the data line. The pixel electrode is connected to the drain electrode of the TFT.

In addition, a black matrix, a color filter layer and a common electrode are formed on an inner surface of the second substrate 114. The black matrix corresponds to the gate line, the data line and the TFT. The color filter layer includes red, green and blue color filters each corresponding to the pixel region. The common electrode is formed on the color filter layer. Further, an alignment layer determining an initial alignment direction is formed between the liquid crystal layer and each of the first and second substrates 112 and 114, and a seal pattern is formed at a boundary portion between the first and second substrates 112 and 114. Moreover, a polarizing plate selectively transmitting polarized light is formed on an outer surface of at least one of the first and second substrates 112 and 114.

A printed circuit board (PCB) 117 for driving the liquid crystal panel 110 is connected to at least one side of the liquid crystal panel 110 through a connection means 116 such as a tape carrier package (TCP). The PCB 117 may be bent to be disposed between the liquid crystal panel 110 and the main frame 130 or between the liquid crystal panel 110 and the bottom frame 150 when the liquid crystal panel 110 is coupled with the main, top and bottom frames 130, 140 and 150.

In the liquid crystal panel 110, when the TFT is turned on according to a gate signal supplied through the gate line by a gate driving circuit, a data signal supplied through the data line by a data driving circuit is transmitted to the pixel electrode, and an electric field between the pixel electrode and the common electrode modulates alignment direction of liquid crystal molecules of the liquid crystal layer to generate transmittance difference.

The backlight unit 120 is disposed under the liquid crystal panel 110 to display images by using the transmittance difference. The backlight unit 120 includes a light emitting diode (LED) assembly 129, a reflecting plate 125 of white or silver color, a light guide plate 123 on the reflecting plate 125 and a plurality of optical sheets 121. The LED assembly 129 is disposed at one side of the light guide plate 123 to face a light-entering portion of the light guide plate 123, and includes a plurality of LEDs 129a and an LED printed circuit board (PCB) 129b where the plurality of LEDs 129a are formed. The light guide plate 123 provides a plane light to the liquid crystal panel 110 by using total reflection of light from the plurality of LEDs 123a. In addition, the light guide plate 123 may include a predetermined pattern on a rear surface thereof to improve uniformity of the plane light.

The reflecting plate 125 is disposed under the light guide plate 123 to reflect light passing through the rear surface of the light guide plate 123 toward the liquid crystal panel 110, thereby improving light efficiency and brightness. The plurality of optical sheets 121 disposed over the light guide plate 123 include a diffusing sheet and at least one collimating sheet so that the more uniform plane light can enter the liquid crystal panel 110 by diffusion and collimation.

The liquid crystal panel 110 and the backlight unit 120 are coupled with each other by the main, top and bottom frames 130, 140 and 150. The top frame 140 has a rectangular ring shape having an L shaped cross-section and covers front boundary portions of the liquid crystal panel 110 so that the images of the liquid crystal panel 110 can be displayed through an opening of the top frame 140. In addition, the bottom frame 150 that the liquid crystal panel 110 and the backlight unit 120 are disposed over has a rectangular plate shape such that four edge portions thereof are bent upwardly. The main frame 130 having a rectangular band shape is disposed over the bottom frame 150 and surrounds side portions of the liquid crystal panel 110 and the backlight unit 120. The main frame 130 is combined with the top and bottom frames 140 and 150 to constitute the LCD device.

The main frame 130 may be formed of synthetic resin by a molding method. In addition, a protruding portion 131 is formed on an inner surface of one side of the main frame 130, and a rib 135 (FIG. 4) preventing light leakage is formed on an end portion of the protruding portion 131.

The backlight unit 120 of FIG. 3 may be referred to as a side light type. In another embodiment, a plurality of LEDs 129a may be disposed on the PCB 129b along a plurality of lines, and two LED assemblies may be disposed on opposite two inner surfaces of the bottom frame 150.

Figure 4:
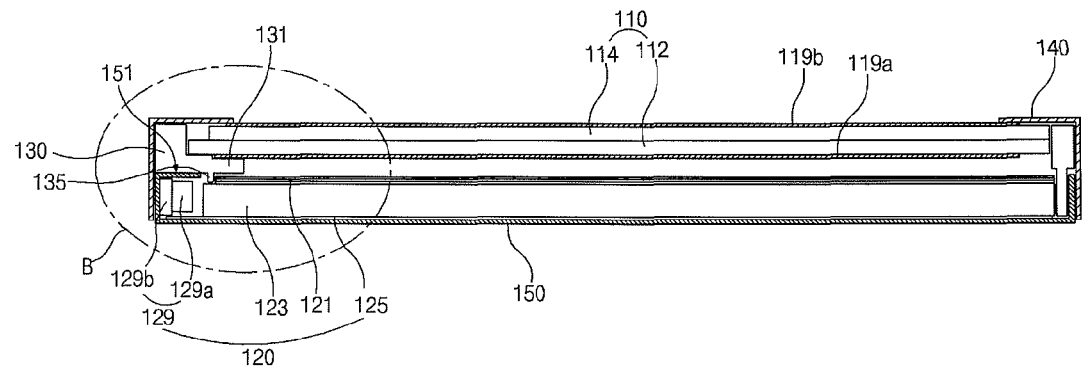
FIG. 4 is a cross-sectional view showing a liquid crystal display device according to an embodiment of the present invention.
Figure 5:
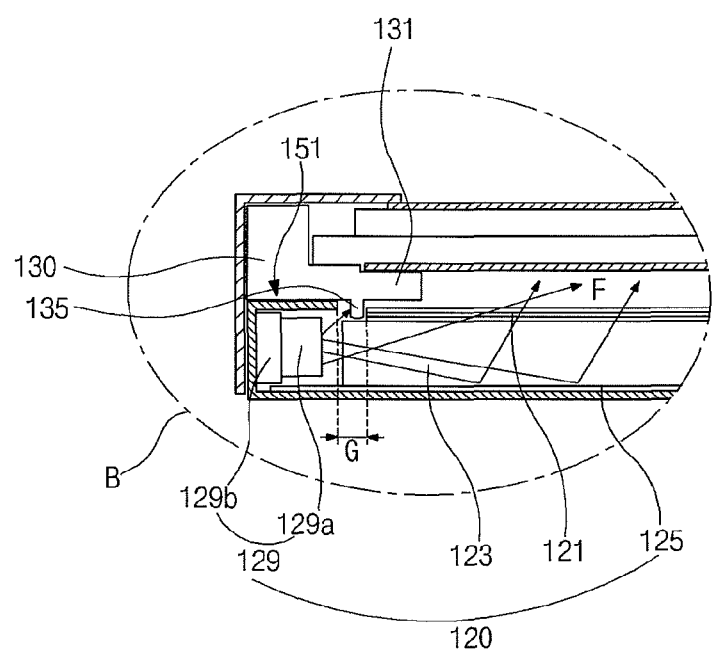
FIG. 5 is a magnified cross-sectional view of portion B of FIG. 4.

FIG. 4 is a cross-sectional view showing a liquid crystal display device according to an embodiment of the present invention and FIG. 5 is a magnified cross-sectional view of a B portion of FIG. 4.

In FIG. 4, a backlight unit 120 includes a reflecting plate 125, a light guide plate 123, an LED assembly 129 including a plurality of LEDs 129a along a side of the light guide plate 123 and an LED PCB 129b having the plurality of LEDs 129a thereon and a plurality of optical sheets 121 over the light guide plate 123. A liquid crystal panel 110 that includes first and second substrates 112 and 114 facing and spaced apart from each other and a liquid crystal layer (not shown) between the first and second substrates 112 and 114 is disposed over the backlight unit 120. Polarizing plates 119a and 119b are formed on outer surfaces of the liquid crystal panel 110.

The liquid crystal panel 110 and the backlight unit 120 are surrounded by a main frame 130, and a top frame 140 surrounding a front boundary portion of the liquid crystal panel 110 and the bottom frame 150 covering a rear surface of the backlight unit 120 are combined with the main frame 130 so that the liquid crystal panel 110 and the backlight unit 120 can be coupled. Accordingly, the liquid crystal panel 110 and the backlight unit 120 are modularized to be protected from impact and light loss is minimized.

The LED assembly 129 may include the plurality of LEDs 129a each emitting one of red, green and blue colored lights and the LED PCB 129b where the plurality of LEDs 129a are formed by a surface mount technology (SMT). Since all the plurality of LEDs 129a on the LED PCB 129b are turned on together, the LED assembly 129 may emit white colored light by mixture of the red, green and blue colored lights.

Alternatively, the LED assembly 129 may include a plurality of LEDs each emitting one of red, green, blue, yellow and orange colored lights, or may include a plurality of LEDs each emitting white colored light. The LED emitting the white colored light may be formed by an LED emitting blue colored light and a yellow fluorescent material.

Although a single LED is shown in FIG. 4, the plurality of LEDs 129a may be disposed on the LED PCB 129b to be spaced apart from each other by a predetermined gap, and a power may be supplied to the plurality of LEDs 129a from an external circuit. The LED PCB 129b includes an insulating plate such as resin or ceramic and conductive lines on the insulating plate so that various electric elements can be formed on the insulating plate and can be connected to each other through the conductive lines. For example, the LED PCB 129b may include one of an FR4 (Flame Retardant composition 4) PCB of epoxy type, a flexible printed circuit board (FPCB) and a metal core printed circuit board (MCPCB).

Recently, the MCPCB has been widely used to radiate heat from the plurality of LEDs 129a promptly. When the MCPCB is used as the LED PCB 129b, an insulating layer of polyimide resin may be formed on a metal core of the insulating plate and the conductive lines are formed on the insulating layer to be electrically insulated from the metal core. As a result, the heat of relatively high temperature from the plurality of LEDs 129a is rapidly radiated to exterior through the metal core.

The LED assembly 129 is fixed by an attachment so that the light from the plurality of LEDs 129a can face a light-entering portion of the light guide plate 123. Accordingly, an edge of the bottom frame 150 is bent upwardly and then inwardly to have a bent portion 151, and the LED assembly 129 is fixed to the bent portion 151 with an adhesive material such as a dual coated tape.

The heat of relatively high temperature from the plurality of LEDs 129a is transmitted to the bottom frame 150 through the LED PCB 129b of MCPCB and then is radiated to exterior. In addition, the light from the plurality of LEDs 129a is focused on the light-entering portion of the light guide plate 123 by the bent portion 151 and is refracted in the light guide plate 123 toward the liquid crystal panel 110. The refracted light in the light guide plate 123 and the reflected light by the reflecting plate 125 are processed as a uniform plane light of high quality while passing through the plurality of optical sheets 121 and are supplied to the liquid crystal panel 110.

The bent portion 151 of the bottom frame 150 and the light guide plate 123 are spaced apart from each other by a gap G, and a rib 135 of the main frame 130 is disposed in the gap G to prevent light leakage. Accordingly, a protruding portion 131 is formed on an inner surface of one side of the main frame 130 such that a top surface of the protruding portion 131 supports the liquid crystal panel 110, and the rib 135 perpendicularly protrudes from a bottom surface of the protruding portion 131 toward the LED assembly 129. In addition, a silicon pad (not shown) may be formed between the protruding portion 131 and the liquid crystal panel 110 to protect the liquid crystal panel 110 from the protruding portion 131. Since the rib 135 is disposed in the gap G between the bent portion 151 of the bottom frame 150 and the light guide plate 123, the light leakage through the gap G is prevented by the rib 135.

In FIG. 5, after the light F is emitted from the plurality of LEDs 129a facing the light-entering portion of the light guide plate 123, the light F is inputted into the light guide plate 123 through the light-entering portion. The light F inputted into the light guide plate 123 is uniformly diffused in the light guide plate 123 by total reflection to become a plane light for the liquid crystal panel 110. The light guide plate 123 may include a predetermined pattern on a rear surface thereof to improve uniformity of the plane light. For example, the predetermined pattern may include an elliptical pattern, a polygonal pattern and a hologram pattern and may be formed by a printing method or an injection molding method.

Since each of the plurality of LEDs 129a has an emission angle within a range of about 120° to about 180°, a portion of the light F emitted from each of the plurality of LEDs 129a is not inputted into the light guide plate 123 and is scattered upwardly or downwardly with respect to the light guide plate 123. However, since the rib 135 of the main frame 130 blocks the portion of the light F scattered upwardly, direct incidence of the portion of the light F into the liquid crystal panel 110 through the gap G is prevented. In addition, the portion of the light F scattered downwardly is reflected by the reflecting plate 125 on the bottom frame 150 to be inputted into the light guide plate 123.

The rib 135 may have a width corresponding to the gap G and may protrude from the protruding portion 131 of the main frame 130 by a predetermined length corresponding to a thickness of the plurality of optical sheets 121. For example, the width of the rib 135 may be greater than about 90% of a distance of the gap G and may be smaller than the distance of the gap G. In addition, the length of the rib 135 may be substantially the same as the thickness of the plurality of optical sheets 121. Since the rib 135 protrudes in a space for the plurality of optical sheets 121, the thickness of the LCD device of the present invention does not increase as compared with the thickness of the LCD device of the related art. Further, since the rib 135 may include the same material as the main frame 130, an additional material cost is not required.

Consequently, in the LCD device according to an embodiment of the present invention, the light leakage through the gap G between the bent portion 151 of the bottom frame 150 and the light guide plate 123 is prevented by the rib 135 of the main frame 130. Accordingly, brightness and color uniformity of the LCD device are improved.

It will be apparent to those skilled in the art that various modifications and variations can be made in a backlight unit and a liquid crystal display device including the backlight unit of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a bottom frame having a bent portion at an edge thereof;
    a light guide plate over the bottom frame, the light guide plate spaced apart from the bent portion by a gap;

a light emitting diode (LED) assembly facing a side of the light guide plate, the LED assembly fixed to the bent portion;
a main frame having a rectangular band shape over the bottom frame, the main frame having a rib corresponding to the gap;
a liquid crystal panel over the light guide plate;
a plurality of optical sheets between the light guide plate and the liquid crystal panel; and
a top frame surrounding a front boundary portion of the liquid crystal panel, the top frame combined with the bottom frame and the main frame,
wherein the rib is configured to block light transmitted directly from the LED assembly to the liquid crystal panel through the gap between the bent portion and the light guide plate, and
wherein a length of the rib is substantially a same as a thickness of the plurality of optical sheets, and the rib does not touch the light guide plate.

2. The device according to claim 1, further comprising a reflecting plate between the bottom frame and the light guide plate.

3. The device according to claim 1, wherein the main frame includes a protruding portion on an inner surface thereof for supporting the liquid crystal panel, and the rib perpendicularly protrudes from the protruding portion to the gap.

4. The device according to claim 1, wherein the rib has a width corresponding to the gap.

5. The device according to claim 1, wherein the rib includes the same material as the main frame.

6. The device according to claim 1, wherein the LED assembly includes a plurality of LEDs each emitting one of red, green and blue colored lights, and an LED printed circuit board (PCB) wherein the plurality of LEDs are formed.

7. The device according to claim 1, wherein the LED assembly includes a plurality of LEDs each emitting a white colored light, and an LED printed circuit board (PCB) wherein the plurality of LEDs are formed.

8. The device according to claim 1, wherein a width of the rib is greater than about 90% of a distance of the gap and is smaller than the distance of the gap.

* * * * *